(12) United States Patent
Eleazer

(10) Patent No.: US 7,378,359 B2
(45) Date of Patent: May 27, 2008

(54) MOLDABLE FIBROUS CONSTRUCTION INCORPORATING NON-WOVEN LAYERS

(76) Inventor: Howell B. Eleazer, 226 Donegal Dr., Moore, SC (US) 29369

( * ) Notice: Subject to any disclaimer, the term of this patent is extended or adjusted under 35 U.S.C. 154(b) by 333 days.

(21) Appl. No.: 11/236,335

(22) Filed: Sep. 27, 2005

(65) Prior Publication Data
US 2007/0070164 A1 Mar. 29, 2007

(51) Int. Cl.
D03D 9/00 (2006.01)
B32B 5/26 (2006.01)
B32B 27/12 (2006.01)

(52) U.S. Cl. .................. 442/4; 442/225; 428/297.4
(58) Field of Classification Search .......... 442/4, 442/25, 26, 36, 189, 224, 225, 266; 428/297.4, 428/299.7; 162/116
See application file for complete search history.

(56) References Cited

U.S. PATENT DOCUMENTS

| | | | |
|---|---|---|---|
| 2,719,803 A | 10/1955 | Nottebohm | 154/46 |
| 3,705,835 A | 12/1972 | Badrain | 161/90 |
| 3,867,248 A | 2/1975 | Bauer | 161/88 |
| 4,309,487 A | 1/1982 | Holmes | 428/516 |
| 4,504,533 A * | 3/1985 | Altenhofer et al. | 428/70 |
| 4,578,301 A * | 3/1986 | Currie et al. | 428/109 |
| 4,686,136 A | 8/1987 | Homonoff et al. | 428/286 |
| 4,980,227 A | 12/1990 | Sekiguchi et al. | 442/3 |
| 5,108,224 A * | 4/1992 | Cabaniss et al. | 256/12.5 |
| 5,124,195 A | 6/1992 | Harpell et al. | 428/152 |
| 5,187,005 A | 2/1993 | Stahle et al. | 428/252 |
| 5,190,809 A | 3/1993 | Marissen et al. | 428/225 |
| 5,192,601 A | 3/1993 | Neisler | 428/120 |
| 5,437,905 A | 8/1995 | Park | 428/105 |
| 5,443,882 A | 8/1995 | Park | 428/103 |
| 5,443,883 A | 8/1995 | Park | 428/103 |
| 5,492,580 A | 2/1996 | Frank | 156/72 |
| 5,547,536 A | 8/1996 | Park | 156/292 |
| 5,578,370 A | 11/1996 | Ferrar et al. | 428/288 |
| 5,614,303 A | 3/1997 | Baigas, Jr. | 442/247 |
| 5,635,288 A | 6/1997 | Park | 428/105 |
| 5,643,390 A | 7/1997 | Don et al. | 156/307.1 |
| 5,683,794 A | 11/1997 | Wadsworth et al. | 428/284 |
| 5,855,991 A | 1/1999 | McLarty, III | 428/195 |
| 5,861,202 A | 1/1999 | Kimura et al. | 428/105 |
| 5,935,651 A | 8/1999 | Klocek et al. | 427/256 |

(Continued)

FOREIGN PATENT DOCUMENTS

| | | |
|---|---|---|
| DE | 198 23 926 | 12/1999 |
| EP | 0 344 318 | 12/1989 |
| EP | 0 733 460 | 9/1996 |
| EP | 0 733 476 | 9/1996 |
| EP | 0 872 586 | 10/1998 |

(Continued)

*Primary Examiner*—Anh T. N. Vo
(74) *Attorney, Agent, or Firm*—Terry T. Moyer; Cheryl J. Brickey

(57) ABSTRACT

A composite construction incorporating one or more non-woven layers at least partially formed from heat fused monoaxially drawn tape fiber elements of discrete length. The non-woven layers are provided with a mat structure covering across at least one surface. The mat structure covering is formed at least partially from interwoven heat fused, monoaxially drawn tape fiber elements of elongate length. The tape fiber elements in the woven and non-woven layers incorporate a base layer of a strain oriented polymer and at least one covering layer of a heat fusible polymer. The covering layer of the tape fiber elements is characterized by a softening point below that of the base layer to permit bonding fusion upon application of heat.

16 Claims, 4 Drawing Sheets

U.S. PATENT DOCUMENTS

| | | | | |
|---|---|---|---|---|
| 5,935,678 A | 8/1999 | Park | | 428/105 |
| 6,054,086 A | 4/2000 | Kurihara et al. | | 264/147 |
| 6,083,583 A | 7/2000 | Klocek et al. | | 428/182 |
| 6,127,293 A | 10/2000 | Kimura et al. | | 442/199 |
| 6,156,679 A | 12/2000 | Takaoka et al. | | 442/327 |
| 6,312,638 B1 | 11/2001 | Ward et al. | | 264/322 |
| 6,322,658 B1 | 11/2001 | Byma et al. | | 156/309.9 |
| 6,328,923 B1 | 12/2001 | Jones et al. | | 264/494 |
| 6,458,727 B1 | 10/2002 | Jones et al. | | 442/409 |
| 6,509,105 B2 | 1/2003 | Olvey | | 428/481 |
| 6,824,863 B1 | 11/2004 | Kitayama et al. | | 428/299.7 |
| 6,835,677 B2 | 12/2004 | McCabe et al. | | 442/149 |
| 6,949,280 B2 | 9/2005 | Brillhart, III et al. | | 428/105 |
| 7,049,251 B2 * | 5/2006 | Porter | | 442/79 |
| 2003/0148076 A1 | 8/2003 | Huang | | 428/196 |
| 2004/0242103 A1 | 12/2004 | Loos et al. | | 442/185 |
| 2005/0003727 A1 | 1/2005 | Chiou | | 442/239 |
| 2006/0151104 A1 | 7/2006 | Jacobs et al. | | 156/308.2 |

FOREIGN PATENT DOCUMENTS

| | | |
|---|---|---|
| EP | 0 715 571 | 5/2000 |
| EP | 1 21 338 | 6/2002 |
| EP | 1 023 164 | 4/2004 |
| EP | 1 650 021 | 4/2006 |
| GB | 1 387 701 | 3/1975 |
| JP | 62 90317 | 4/1987 |
| JP | 07300763 | 11/1995 |
| JP | 10 251956 | 9/1998 |
| JP | 2000008244 | 1/2000 |
| WO | WO 98/12370 | 3/1998 |
| WO | WO 98/12371 | 3/1998 |
| WO | WO 02090082 | 11/2002 |
| WO | WO 03008190 | 1/2003 |
| WO | WO 03045659 | 6/2003 |
| WO | WO 2004028803 | 4/2004 |
| WO | WO 2006046862 | 5/2006 |

* cited by examiner

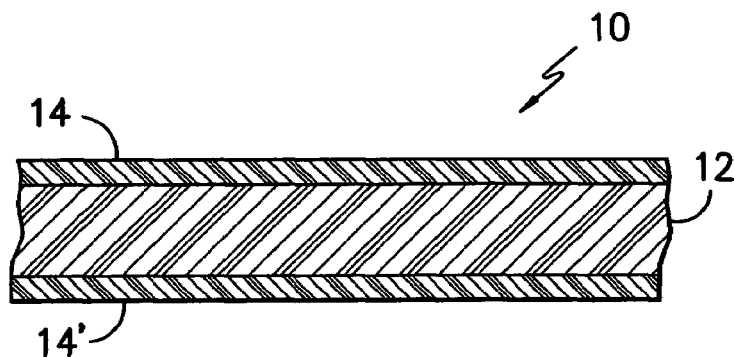
FIG. -1-
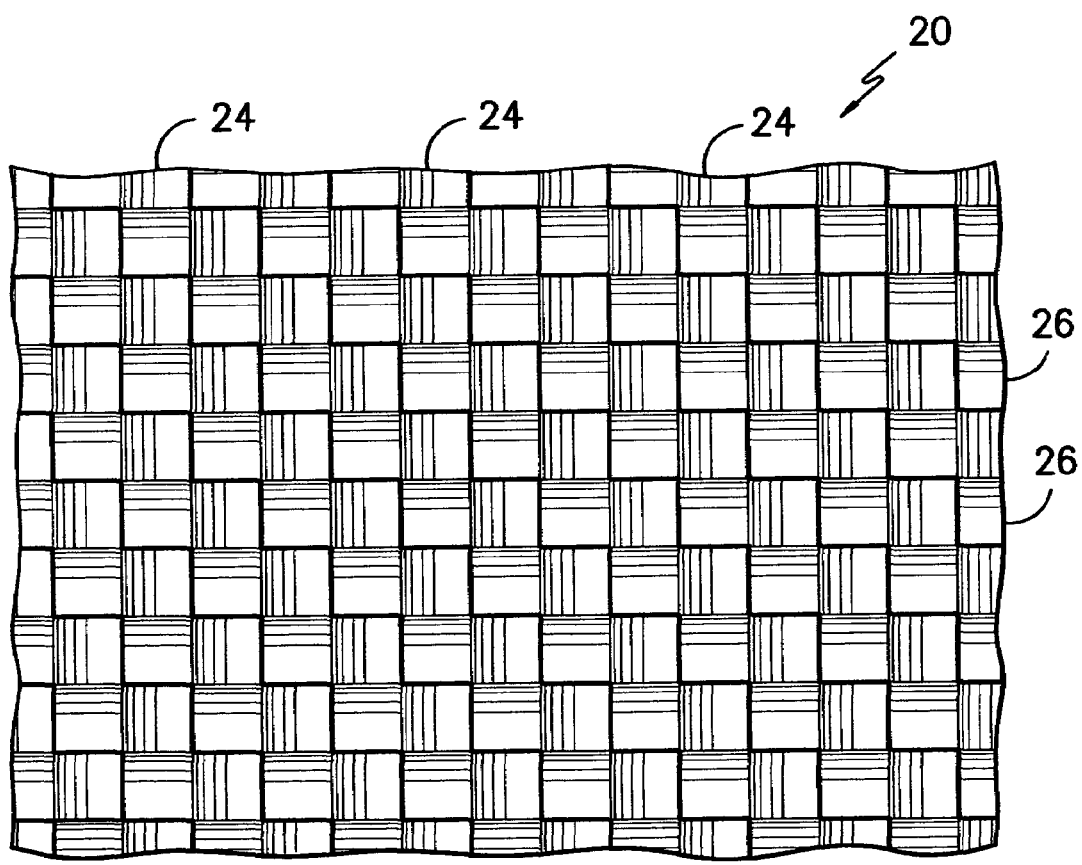
FIG. -2-

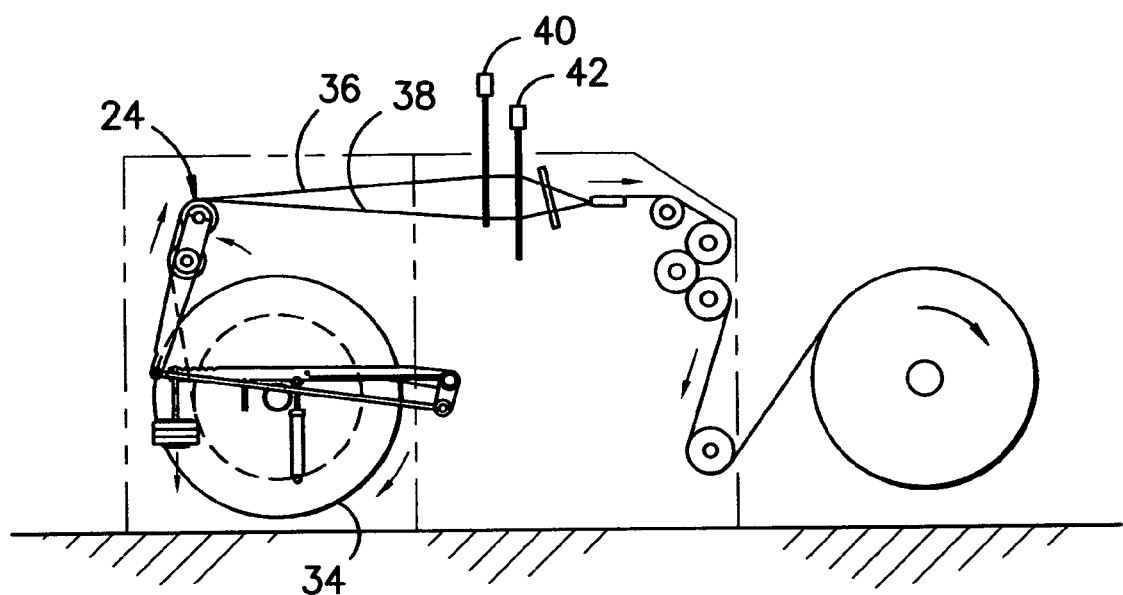
FIG. -3-

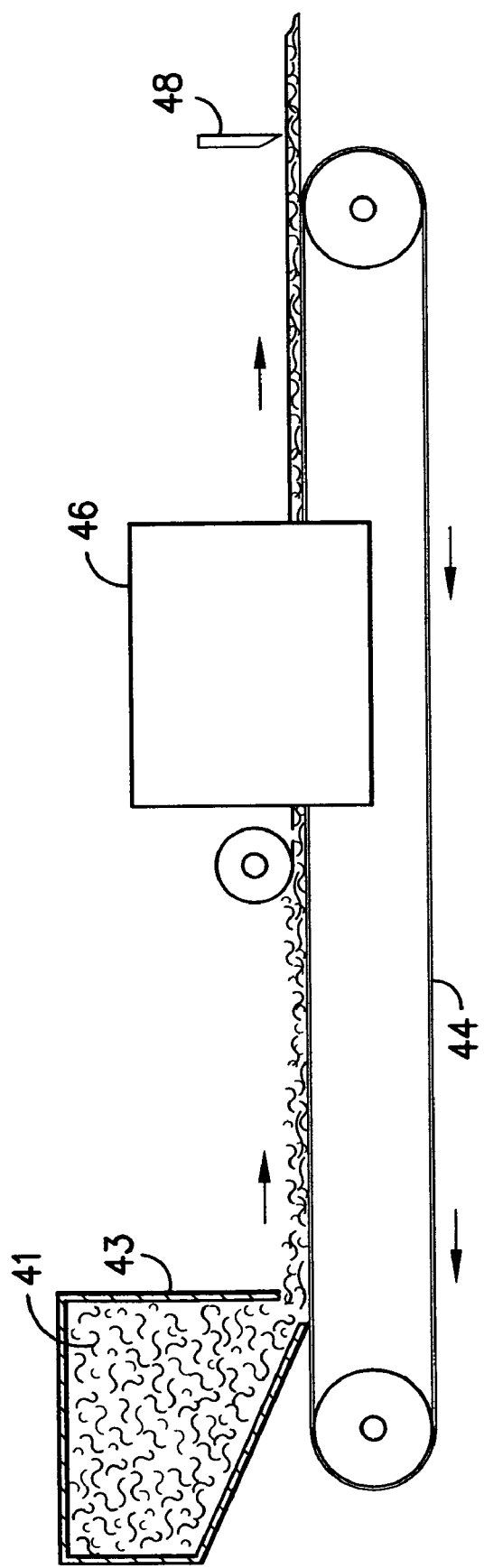
FIG. -4-

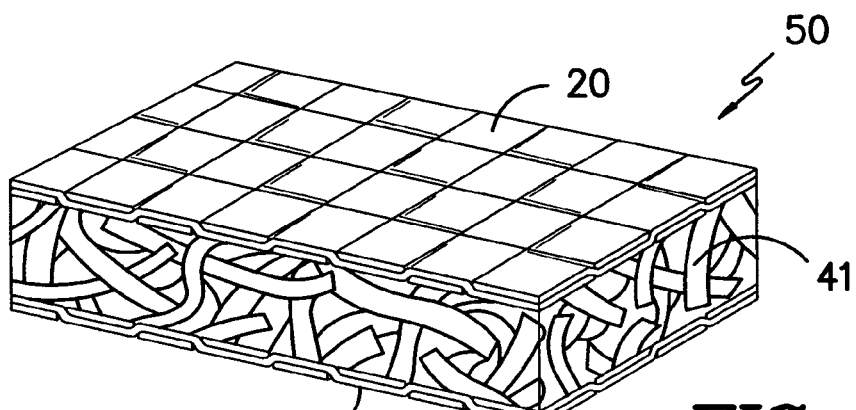
FIG. -5-
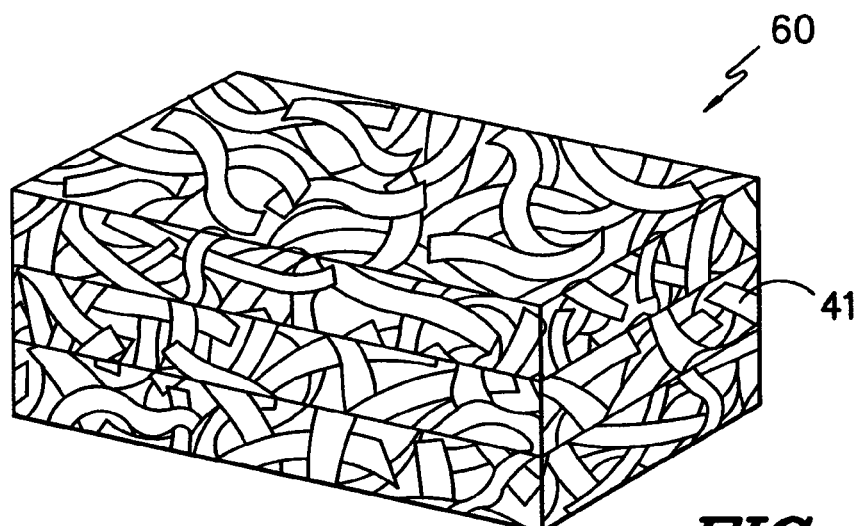
FIG. -6-
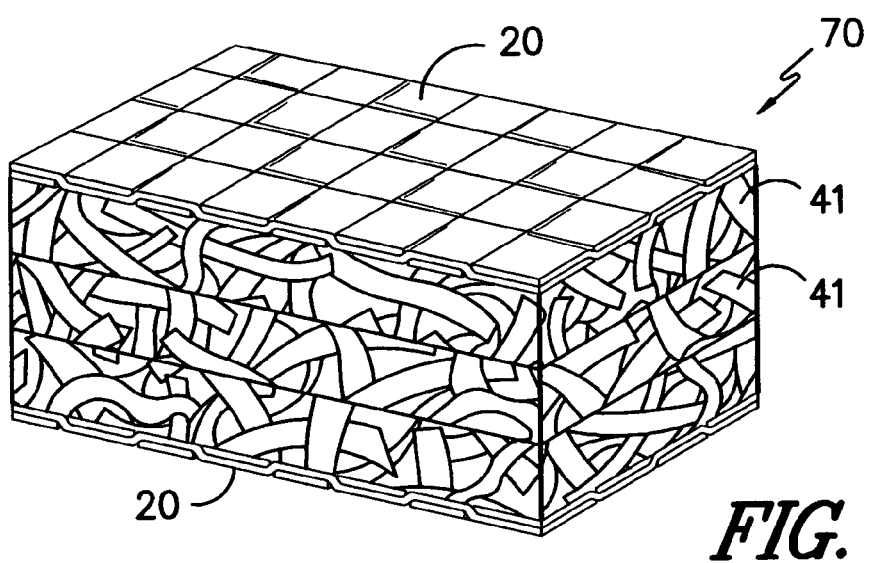
FIG. -7-

MOLDABLE FIBROUS CONSTRUCTION INCORPORATING NON-WOVEN LAYERS

TECHNICAL FIELD

This invention relates to a thermoplastic composite material. More particularly, the invention relates to a composite incorporating one or more layers of heat fused, discrete length tape elements in adjoined relation to at least one covering layer. The composite material is suitable for a variety of applications requiring a low weight and mechanical strength in the direction of the plane of the structure as well as in a direction normal thereto. Methods of forming such composite materials are also provided.

BACKGROUND OF THE INVENTION

Fibrous structures formed from heat fused, discrete length staple fibers of standard cylindrical geometry are generally known. In the past, such fibrous structures have been formed by blending staple fibers of a first polymer with staple fibers of a second fiber having a lower melting point across its surface and thereafter applying heat and pressure to force point bonding between the fibers. The second fiber may be of substantially uniform composition through its cross-section or may be of a so called bicomponent construction wherein a sheath of a lower melting point polymer is wrapped around a core of a compatible higher melting point polymer.

It has been proposed to form tape structures from polypropylene film that is coated with a layer of propylene copolymer including ethylene units such that the coating has a lower softening point than the core. Such tape structures are disclosed, for example, in U.S. Pat. No. 5,578,370, the teachings of which are hereby incorporated by reference in their entirety. U.S. Patent Application 2004/0242103A1 (incorporated by reference) has also proposed to form monoaxially drawn tape structures characterized by substantial draw ratios and incorporating a central layer of a polyolefin with one or two covering layers of a polyolefin from the same class as the central layer. The DSC melting point of the outer layers is lower than that of the central layer to facilitate heat bonding.

SUMMARY OF THE INVENTION

The present invention provides advantages and/or alternatives over the prior art by providing a composite construction incorporating one or more non-woven layers at least partially formed from monoaxially drawn tape fiber elements of discrete length incorporating a central or base layer of a strain oriented polymer and at least one covering layer of a heat fusible polymer. In this regard, the term non-woven refers to structures incorporating a mass of fiber elements that are entangled and/or heat fused so as to provide a coordinated structure with a degree of internal coherency. The covering layer of the tape fiber elements is characterized by a softening point below that of the base layer to permit fusion bonding upon application of heat. The non-woven layers are provided with a mat structure covering across at least one surface. The mat structure covering is formed at least partially from interwoven heat fused, monoaxially drawn tape fiber elements of elongate length incorporating a central or base layer of a strain oriented polymer and at least one covering layer of a heat fusible polymer. The covering layer of the tape fiber elements is characterized by a softening point below that of the base layer to permit bonding fusion upon application of heat and is heat fusible to the nonwoven layers. The composite is moldable to a three-dimensional geometry.

BRIEF DESCRIPTION OF THE DRAWINGS

The accompanying drawings which are incorporated in and which constitute a part of this specification illustrate several exemplary constructions and procedures in accordance with the present invention and, together with the general description of the invention given above and the detailed description set forth below, serve to explain the principles of the invention wherein:

FIG. 1 illustrates schematically a cross-section of the multilayer film;

FIG. 2 illustrates a mat woven from drawn strips of the multilayer film;

FIG. 3 illustrates schematically a process for forming a fabric woven from drawn strips of the multilayer film;

FIG. 4 illustrates schematically a process for forming a nonwoven article from drawn strips of the multilayer film;

FIG. 5 illustrates schematically a composite structure made up of a nonwoven layer joined to a woven layer;

FIG. 6 illustrates schematically a composite structure made up of a multiplicity of nonwoven layers joined together; and FIG. 7 illustrates schematically a composite structure made up of a multiplicity of nonwoven layers joined together with an outermost woven layer.

DESCRIPTION OF PREFERRED EMBODIMENTS

Exemplary embodiments of the present invention will now be described by reference to the accompanying drawings, in which, to the extent possible, like reference numerals are used to designate like components in the various views. Turning now to the drawings, FIG. 1 depicts an exemplary construction of multilayer polymeric film 10 made up of a core layer 12 disposed between surface layers 14, 14'. Alternatively, it is contemplated that only a single surface layer may be present, thereby resulting in a construction of a core layer 10 being adjacent to surface layer 14. The film 10 may be formed by any conventional means of extruding such multilayer polymeric films. By way of example, and not limitation, the film 10 may be formed by blown film or cast film extrusion. The film 10 is then cut into a multiplicity of longitudinal strips of a desired width (not shown) by slitting the film 10 to yield tapes having cross-sections in the thickness dimension as shown in FIG. 1. The strips of film 10 are then drawn in order to increase the orientation of the core layer 10 so as to provide increased strength and stiffness of the material.

It is contemplated that the core layer 12 of the film 10 is preferably made up of a molecularly-oriented thermoplastic polymer, the core layer 12 being fusible to each of surface layers 14, 14' at their respective intersections. The core layer 12 is compatibly bonded to each of surface layers 14, 14' between their contiguous surfaces. It is further contemplated that the surface layers 14, 14' have a softening temperature, or melting temperature, lower than that of the core layer 12. By way of example only, it is contemplated that the core layer 12 is a polyolefin polymer such as polypropylene, polyethylene, a polyester such as polyethyleneterephthalate, or a polyamide such as Nylon 6 or Nylon 6-6. According to one potentially preferred practice, the core layer 12 may be polypropylene or polyethylene. The core layer 12 may account for about 50-99 wt. % of the film 10, while the surface layers 14, 14' account for about 1-50 wt. % of the film 10. The core layer 12 and surface layers 14, 14' being made up of the same class of materials to provide an advantage with regard to recycling, as the core layer 12 may include production scrap.

In an embodiment with a core layer 12 of polypropylene, the material of surface layers 14, 14' is preferably a copolymer of propylene and ethylene or an a-olefin. Particularly advantageous results have been achieved by using a random copolymer of propylene-ethylene. It may be preferred to use said copolymer with an ethylene content of about 1-25 mol. %, and a propylene content of about 75-99 mol. %. It may be further preferred to use said copolymer with a ratio of about 95 mol. % propylene to about 5 mol. % ethylene. Instead of said copolymer or in combination therewith, a polyolefin, preferably a polypropylene homopolymer or polypropylene copolymer, prepared with a metallocene catalyst, may be used for the surface layers 14, 14'. It is also contemplated that materials such as poly 4methyl 1pentene (PMP) and polyethylene may be useful as a blend with such copolymers in the surface layers 14, 14'. The surface layer material should be selected such that the softening point of the surface layer 14, 14' is at least about 10° C. lower than that of the core layer 12, and preferably between about 15-40° C. lower. The upper limit of this difference is not thought to be critical, and the difference in softening points is typically less than 70° C.

By way of example only, and not limitation, one film material that may be particularly useful is believed to be marketed under the trade designation PURE by Lankhorst/Indutech having a place of business in Sneek, The Netherlands.

As mentioned above, the film 10 may be cut into a multiplicity of longitudinal strips of a desired width by slitting the film 10 in a direction transverse to the layered orientation of core layer 12 and surface layers 14, 14'. The strips of film 10 are then drawn in order to increase the orientation of the core layer 10 so as to provide increased strength and stiffness to the material. After the drawing process is complete, the resulting strips are in the range of about 1 to about 5 millimeters wide.

FIG. 2 illustrates a mat fabric 20 woven from strips of the film 10. As will be appreciated, the fabric 20 may be utilized to form a multilayered composite structure. As illustrated, the fabric 20 preferably includes a multiplicity of warp strips 24 of film 10 running in the warp direction of the fabric 20. The warp strips 24 are interwoven with fill strips 26 running in the fill direction in transverse relation to the warp strips 24. As shown, the fill strips 26 are interwoven with the warp strips 24 such that a given fill strip extends in a predefined crossing pattern above and below the warp strips 24. In the illustrated arrangement, the fill strips 26 and the warp strips 24 are formed into a so called plain weave wherein each fill strip 26 passes over a warp strip and thereafter passes under the adjacent warp strip in a repeating manner across the full width of the fabric 20. However, it is also contemplated that any number of other weave constructions as will be well known to those of skill in the art may likewise be utilized. By way of example only, and not limitation, it is contemplated that fabric 20 may be woven in a twill pattern, wherein the fill strips 26 pass over two or more adjacent warp strips 24 before transferring to a position below one or more adjacent warp strips. It is likewise contemplated that the mat may utilize other interwoven constructions including knit constructions, weft insertion constructions and the like if desired. Thus, the term "interwoven" is meant to include any construction incorporating interengaging formation strips.

By way of example only, the formation of fabric 20 as described may be understood through reference to the simplified schematic in FIG. 3. As illustrated, in the formation process the warp strips 24 of film 10 may be unwound from a beam 34 and separated into two or more sheets 36, 38 for processing. For example, the sheet 36 may be made up of the even numbered warp strips while the sheet 38 may be made up of odd numbered warp strips across the width of the beam. As illustrated, the sheets 36, 38 are threaded through an arrangement of harnesses 40, 42 which may be moved relative to one another to alternate the relative position of the sheets 36, 38, thereby adjusting the shed or spacing between the sheets. As will be appreciated by those of skill in the art, at the weaving machine 32 the fill strips 26 are inserted through the shed between the sheets 36, 38 while the sheets 36, 38 are in spaced relation to one another. As previously indicated, multiple fill strips 26 may be inserted through the shed so as to be side by side in the same orientation relative to the sheets 36, 38. Thereafter, the harnesses 40, 42 may be adjusted so as to reverse the relative position of the sheets 36, 38. Such reversal opens a new shed through which single or multiple fill strips 26 may be inserted before the process is repeated. As will be appreciated, the formation process as described substantially emulates standard weaving processes as are well known to those of skill in the art. Of course, it is to be understood that while the processes in the figures are illustrated as single continuous processing lines, that individual steps or combinations of steps may be carried out at different locations if desired.

In order to securely fuse the warp strips 24 to the fill strips 26 while maintaining the interwoven spatial relation between them, it is contemplated that the warp strips 24 and the fill strips 26 will preferably be heated, under pressure, to a temperature above the softening point of surface layers 14, 14' and below that of the core layer 12. In so doing, the surface layers 14, 14' will melt while the core layer 12 will remain substantially solid and highly oriented. As the fabric 20 then cools, the surface layers 14, 14' will fuse together, thereby forming a solid matrix through which is woven the highly oriented, stiff structure of the core layer 12. By way of example and not limitation, according to one contemplated practice, several layers of fabric 20 may be stacked in layered relation prior to the application of heat and pressure in order to form a multilayered woven composite structure. The layers of fabric 20 may be formed from a single sheet of fabric that is repeatedly folded over itself, or from several discrete overlaid sheets. Alternatively, a multilayered woven composite may be formed by heating, under pressure, several woven composites previously formed from single or multiple layers of fabric 20. Subjected to a temperature above the softening point of the surface layers 14, 14' and below that of the core layer 12, the matrix will again melt while the core layers remain substantially solid. Upon cooling, the surface layers 14, 14' will again fuse and re-form the matrix. Any of these methods may be employed to form a woven composite with any desired thickness or number of layers. According to potentially preferred practices, about 2 to 30 layers may be stacked together to provide stable structures. For particularly rigorous environments of use such as anti-ballistic protection, a stacked arrangement with about 100 to 500 stacked layers may be preferred.

Due to at least in part to the biaxial orientation of the interwoven, highly oriented core layers 12, which are securely held within a matrix of the fused surface layers 14, 14', a composite structure formed from the woven fabric 20 as described will exhibit excellent mechanical strength characteristics in both the planar and normal directions at a low weight. This favorable combination of high strength and low weight makes such a composite suitable for variety of uses.

In addition to the composite formed from interwoven mat fabric 20, the present invention further contemplates a process for forming a nonwoven composite 40 from strips of the film 10, as depicted schematically in FIG. 4. As discussed with respect to the woven fabric 20, nonwoven composite is formed from drawn strips of film 10. Prior to being processed into the nonwoven composite 40, the strips of film 10 are cut into staple tape elements of discrete length by any conventional means that are well known to those in the art. According to a potentially preferred embodiment, the strips of film 10 are cut into staple tape elements characterized by aspect ratios of length/width in the range of about 3 to about 150 and more preferably about 15 to about 100, with widths in the range of about 1 mm to about 5 mm, and lengths in the range of about 10 mm to about 250 mm. According to one particularly preferred embodiment, the strips of film 10 are cut into staple lengths of about 75 mm with a width of about 2 mm, or more preferably about 2.2 mm.

To form the nonwoven composite, a mass of staple tape elements 41 is provided into feed chute 43, which in turn deposits a portion of the mass of staple tape elements 41 onto a conveyor 44. The feed chute may be adapted to loosely lay the staple tape elements 41 onto the conveyor 44 in a random orientation by conventional means as is well known in the nonwovens art. Due at least in part to the stiffness of the staple tape elements 41, they tend not to stick to one another, thereby allowing a mass of staple tape elements 41 to "flow" when poured from feed chute 43. Alternatively, the staple tape elements 41 may be laid down in a relatively ordered, or patterned, orientation. In a preferred practice, the staple tape elements 41 do not undergo an entangling process during or after being laid onto the conveyor 44. However, such entangling may be performed if desired. The conveyor 44 advances the staple tape elements 41 towards and through a high-temperature press unit 46. By way of example and not limitation, the press unit 46 may be a batch, or platen press. As the staple tape elements 41 travel through the press 46, they are exposed to elevated temperature, under pressure. According to a preferred practice, the staple tape elements 41 are heated to a temperature above the softening point of the surface layers 14, 14' and below the softening point of the core layer 12 while under compressive force. According to a further preferred practice, the staple tape elements 41 are heated to a temperature of about 130-160° C., at a pressure of about 0.5-70 bar. As discussed with respect to the woven composite, when exposed to such an elevated temperature and pressure, the surface layers 14, 14' will melt while the core layer 12 will remain substantially solid. Upon cooling, the surface layers 14, 14' will fuse, thereby forming a nonwoven composite 40, including a solid matrix through which the staple tape elements 41 of highly oriented, stiff core layer 12 are distributed. According to a potentially preferred practice, the staple tape elements are cooled under pressure to a temperature less than about 115° C. It is contemplated that maintaining pressure during the cooling step tends to inhibit shrinkage. After cooling, the nonwoven composite is cut to desired dimensions using, for example, knife 48.

Of course, it is to be understood that the process is in no way limited to a batch or platen press. Rather, it is contemplated that any suitable press may be used to provide appropriate combinations of temperature and pressure. In this regard, it is contemplated that processing at higher pressures may reduce the temperature requirements. Without wishing to be limited to a specific theory, it is believed that higher pressures may facilitate polymer flow at lower temperatures. Thus, at the higher end of the pressure range, (greater than about 30 bar) the processing temperature may be about 90-135° C. Moreover, the need for cooling under pressure may be eliminated when such pressures are utilized to facilitate flow.

If desired, it is further contemplated that fillers may be incorporated with the mass of staple tape elements 41 prior to introduction into high-temperature press-unit 46. By way of example and not limitation, the fillers may be thermoplastic chips, powders, pellets, or the like, and may be added to supplement gauge and/or to alter the temperature required to bond the staple tape elements 41.

As depicted in FIG. 6, a multilayered nonwoven composite 60 may be formed by joining at least two discrete nonwoven composite layers. According to one preferred practice, a desired number of nonwoven composite layers, in sheet or panel form, may be stacked in layered relation to one another. The layered composites are subsequently heated, under pressure, in order to re-melt the matrix formed from the previously fused surface layers 14, 14' while the core layer 12 of each staple strip 41 remains substantially solid. Upon cooling, the melted surface layers 14, 14' re-fuse to form a solid matrix securely encasing the highly oriented, stiff core member 12 of each staple strip 41 distributed therein. This process may be repeated using multiple single-layer or multilayer nonwoven composites, or any combination thereof, to form nonwoven composites 60 with any desired thickness or number of layers.

Consolidation of the multiple non-woven layers is preferably carried out at suitable temperature and pressure conditions to facilitate both interface bonding fusion and partial migration the melted surface layer material between the layers. Heated batch or platen presses may be used for multi-layer consolidation. However, it is contemplated that any other suitable press may likewise be used to provide appropriate combinations of temperature and pressure. In this regard, it is contemplated that processing at higher pressures may reduce the temperature requirements. Without wishing to be limited to a specific theory, it is believed that higher pressures may facilitate polymer flow at lower temperatures. Thus, at higher pressures the processing temperature may be reduced. Moreover, the need for cooling under pressure may be eliminated when such pressures are utilized to facilitate flow.

It is contemplated that due at least in part to the inclusion of the highly oriented core layers 12, which are securely held within a matrix of the fused surface layers 14, 14', a nonwoven composite 40 constructed as described will also exhibit excellent mechanical strength characteristics in both the planar and normal directions at a low weight. However, due to the discontinuous and random orientation of the core layers 12 (as opposed to a continuous, biaxial orientation), it was anticipated that nonwoven composites 40, 60 would exhibit mechanical strength characteristics inferior to those of a composite formed from woven fabric 20. To the surprise the inventors, the nonwoven composite 40 exhibited mechanical strength characteristics up to about 85-90% of those achieved by a composite formed from fabric 20 of like weight. This favorable combination of high strength and low weight, combined with the relatively simple processing requirements, make such a composite suitable for variety of applications wherein strength and/or weight cost may not be as imperative as in applications demanding the use of a woven composite. For example, a nonwoven composite may achieve strength characteristics substantially equal to those exhibited by a composite formed from woven fabric 20, but at a slightly greater weight. Considering the relatively simple processing techniques, the nonwoven composites also have the further benefit of reduced manufacturing complexity.

It is contemplated that at least one composite formed from woven fabric 20 may be combined with a single nonwoven composite layer to form a bicomponent composite 50, as illustrated in FIG. 5. As illustrated, it is contemplated that a single nonwoven composite layer may be disposed in layered relation between at least two layers of composite formed from woven fabric or mat 20, each of which may itself be formed from one or a multiplicity of layers of woven fabric 20. Alternatively, a single nonwoven composite layer may be disposed in layered relation with a single composite formed from woven fabric 20, which itself may be formed from one or a multiplicity of layers of woven fabric. While in this layered relation, the bicomponent composite 50 may be heated under pressure in order to melt the surface layers 14, 14' of their constituent tape elements. As previously discussed, when cooled, the melted surface layer materials re-fuse to encase the core layers 12 therein.

It is further contemplated that at least one composite formed from woven fabric 20 may be combined with multiple layers of the nonwoven composite material as previously described to form a multicomponent composite 70. Such a construction is illustrated in FIG. 7. In a potentially preferred practice, the multiple layers of nonwoven composite material are is disposed in layered relation between at least two layers of composite formed from woven fabric 20, each of which may itself be formed from one or a multiplicity of layers of woven fabric 20. Alternatively, a multilayered nonwoven composite may be disposed in layered relation with a single composite formed from woven fabric 20, which itself may be formed from one or a multiplicity of layers of woven fabric. While in this layered relation, the component layers of the multicomponent composite 70 may be heated under pressure in order to melt the surface layers 14, 14' of their constituent tape elements. As previously discussed, when cooled, the melted surface layer materials re-fuse to encase the core layers 12 therein.

It has been found that the combination of a nonwoven composite with a composite formed from woven fabric 20 can be formed so as to exhibit levels of mechanical strength approaching those formed entirely from multiple layers of woven fabric 20. At the same time, the cost per unit weight (as well as on a strength basis) for both a bicomponent composite 50 and a multicomponent composite 70 will be substantially less than that of a composite formed entirely of a woven fabric 20, because a significant portion of a bicomponent composite 50 and a multicomponent composite 70 utilizes a nonwoven process that is simpler and cheaper than the weaving process.

Besides the strength, weight, and cost characteristics, a bicomponent composite 50 and a multicomponent composite 70 have the added benefit of having at least one face showing the attractive woven appearance of the composite formed from the woven fabric 20. The woven pattern is aesthetically pleasing, and may provide an additional benefit in applications where outward appearance is a consideration, along with strength and weight.

In addition to the aesthetic appeal of the woven face, the bicomponent composite 50 and the multicomponent composite 70 also have the benefit of the woven composite's inherent abrasion resistance characteristics. That is, it may be advantageous to use a composite with a woven face (such as a bicomponent composite 50 or multicomponent composite 70) in such an environment. The length and interlocking nature of the warp and fill strips 24, 26 may protect the underlying nonwoven construction while preventing the strips 24, 26 from being pulled out of the composite face in case the matrix is cut.

According to a further contemplated practice, a composite sheet or panel as herein described may be formed into a three dimensional shape as desired. In a potentially preferred embodiment, layers of nonfused component layers are placed in layered relation within a desired form. The component layers may include sheets of woven fabric or mats 20 and/or a mass of randomly oriented, nonwoven, staple tape elements 41. Heat is applied to the form under pressure, so as to raise the temperature above the softening point of the core layer 12 thereby permitting deformation. Upon cooling, the surface layers 14, 14' will fuse and thereby encase the highly oriented core layers 12 within a rigid matrix thereby maintaining the molded shape.

The invention may be further understood by reference to the following non-limiting examples:

EXAMPLES 1-4

In each of these examples a multi-component composite sample was formed incorporating a non-woven layer of heat fused blended tape fiber elements cut to predefined lengths in heat bonded relation between woven cover layers of elongate tape fiber elements. The tape fiber elements forming both the blended layer and the woven cover layers were fusible mono-axially drawn tape elements having dimensions of 2.2 mm wide×65 microns thick sold under the trade designation PURE by Lankhorst/Indutech having a place of business in Sneek, The Netherlands. The woven cover layers were a plain weave mat fabric with 11 picks and 11 ends per inch. The mass per unit area of the woven cover layers was about 95 to about 115 grams/square meter+10%.

In each of the examples, a standardized mass of the finite length fiber elements was scattered onto a single layer of the woven construction fabric structure formed from the elongate tape fiber elements. A second woven layer of the same construction and weight as the first layer was laid over the scattered tape elements. The samples were then pressed in a platen press at a temperature of about 300 F and a pressure of about 300 psi. After heating, the formed composite was cooled to 200 F while maintaining the pressure. The pressure was then released and the samples were withdrawn for physical testing. The resultant composites all had a standardized mass per unit area of 1800 grams per square meter.

The standardized mass samples were subjected to an array of physical performance tests including standardized flexural modulus and stiffness tests pursuant to ASTM standard D790, ball burst tests pursuant to ASTM standard 6797, and a screw pull test in which a screw is inserted ½ inch from the end of a 1 inch×6 inch material test strip and into an overlapping metal anchor strip. Linear tension is applied to the free ends of the metal strip and material test strip using a tensile testing apparatus at 20 inches per minute. The peak load is measured to tear the screw through the material test strip. These results are set forth in Table 1 below. It was found that increasing the standard staple length from 0.75 to 3 three inches in the blended layer provided greatly improved performance levels in the measured parameters.

EXAMPLES 5 and 6

Comparative samples formed solely of multiple layers of the woven plain weave mat fabric with 11 picks and 11 ends per inch were also formed. The mass per unit area for each of the woven layers was about 95 to about 115 grams/square meter±10%. The tape fiber elements forming the woven layers were fusible mono-axially drawn tape elements having dimensions of 2.2 mm wide×65 microns thick sold under the trade designation PURE by Lankhorst/Indutech having a place of business in Sneek, The Netherlands. The samples were then pressed in a platen press at a temperature of about 300 F and a pressure of about 300 psi. After heating, the formed composite was cooled to 200 F while maintaining the pressure. The pressure was then released and the samples were withdrawn for physical testing.

The samples were subjected to the same testing procedures as in Examples 1-4 above. These results are set forth in Table 1 below. As can be seen, the composites incorporating a non-woven layer of 3 inch blended staple fibers demonstrated substantially equivalent physical performance to a 16 layer structure of equivalent weight. Thus, equivalent performance may be achieved in a greatly simplified construction.

TABLE 1

|  | Weight (g/m$^2$) | Screw Pull (lbs) | Flex Mod (Gpa) | Stiffness (N-m) | Ball Burst (lbf) |
| --- | --- | --- | --- | --- | --- |
| Example 1 0.75 Inch Staple | 1800 | 223 | 3.3 | 51 |  |
| Example 2 1 Inch Staple | 1800 | 267 | 2.9 | 40 | 780 |
| Example 3 1.5 Inch Staple | 1800 | 322 | 3.4 | 44 | 1060 |
| Example 4 3 Inch Staple | 1800 | 426 | 3.7 | 67 | 1430 |
| Example 5 10 Layer | 1100 | 174 | 5.2 | 16 | 740 |
| Example 6 16 Layer | 1800 | 404 | 4.4 | 66 | 1460 |

As will be appreciated, it has also been found that mechanical performance may be adjusted and controlled by selection of the length of the staple tape elements in the non-woven portion of a composite as formed according to the invention.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. It is therefore intended that the present invention shall extend to all such modifications and variations as may incorporate the broad aspects of the present invention within the full spirit and scope of the following claims and all equivalents thereto.

What is claimed is:

1. A multi-layer moldable fibrous composite construction, the fibrous composite construction comprising:
    at least one layer of non-woven construction comprising a plurality of monoaxially drawn staple fiber elements of tape geometry characterized by an aspect ratio of length divided by width in the range of about 3 to about 150, wherein said staple fiber elements are fusion bonded to one another, at least a portion of the staple fiber elements within the non-woven construction comprising a staple fiber base layer of a strain oriented polymer disposed in layered relation between two staple fiber covering layers of a heat fusible polymer, wherein said staple fiber covering layer is characterized by a softening temperature below that of the staple fiber base layer to permit fusion bonding upon application of heat; and
    a mat structure disposed in covering relation across at least one surface of the non-woven construction, the mat structure comprising a plurality of monoaxially drawn interwoven fiber elements, said interwoven fiber elements comprising an interwoven fiber base layer of a strain oriented polymer disposed in layered relation between two interwoven fiber covering layers of a heat fusible polymer, wherein said interwoven fiber covering layer is characterized by a softening temperature below that of the interwoven fiber base layer to permit fusion bonding upon application of heat, and wherein the polymer forming said interwoven fiber covering layer is adapted for melt fusion bonding to the polymer forming said staple fiber covering layer upon application of temperatures below the softening temperatures of both the staple fiber base layer and interwoven fiber base layer, and wherein the composite of the mat structure and the non-woven construction is adapted for three-dimensional molding.

2. The invention of claim 1, wherein the width of the staple fiber elements is about 2 millimeters.

3. The invention of claim 1, wherein the aspect ratio is about 15 to about 100.

4. The invention of claim 3, wherein the width of the staple fiber elements is about 2 millimeters.

5. The invention of claim 1, wherein the staple fiber elements are characterized by an average length of not less than about 1.5 inches.

6. The invention of claim 1, wherein the staple fiber elements are characterized by an average length of not less than about 3 inches.

7. The invention of claim 1, wherein the aspect ratio is about 34.

8. The invention of claim 7, wherein the width of the staple fiber elements is about 2 millimeters.

9. A multi-layer moldable fibrous composite construction, the fibrous composite construction comprising:
    a non-woven construction comprising a plurality of layers of substantially randomly oriented, monoaxially drawn staple fiber elements of tape geometry characterized by an aspect ratio of length divided by width in the range of about 3 to about 150, wherein said staple fiber elements are fusion bonded to one another, at least a portion of the staple fiber elements within the non-woven construction comprising a staple fiber base layer of a strain oriented polymer disposed in layered relation between two staple fiber covering layers of a heat fusible polymer, wherein said staple fiber covering layer is characterized by a softening temperature below that of the staple fiber base layer to permit fusion bonding upon application of heat; and
    a mat structure disposed in covering relation across at least one surface of the non-woven construction, the mat structure comprising a plurality of monoaxially drawn interwoven fiber elements, said interwoven fiber elements comprising an interwoven fiber base layer of a strain oriented polymer disposed in layered relation between two interwoven fiber covering layers of a heat fusible polymer, wherein said interwoven fiber covering layer is characterized by a softening temperature below that of the interwoven fiber base layer to permit fusion bonding upon application of heat, and wherein the polymer forming said interwoven fiber covering layer is adapted for melt fusion bonding to the polymer forming said staple fiber covering layer upon application of temperatures below the softening temperatures of both the staple fiber base layer and interwoven fiber base layer, and wherein the composite of the mat structure and the non-woven construction is adapted for three-dimensional molding.

10. The invention of claim 9, wherein the width of the staple fiber elements is about 2 millimeters.

11. The invention of claim 9, wherein the aspect ratio is about 15 to about 100.

12. The invention of claim 11, wherein the width of the staple fiber elements is about 2 millimeters.

13. The invention of claim 9, wherein the staple fiber elements are characterized by an average length of not less than about 1.5 inches.

14. The invention of claim 9, wherein the staple fiber elements are characterized by an average length of not less than about 3 inches.

15. The invention of claim 9, wherein the aspect ratio is about 34.

16. The invention of claim 15, wherein the width of the staple fiber elements is about 2 millimeters.

* * * * *